Figure 4:
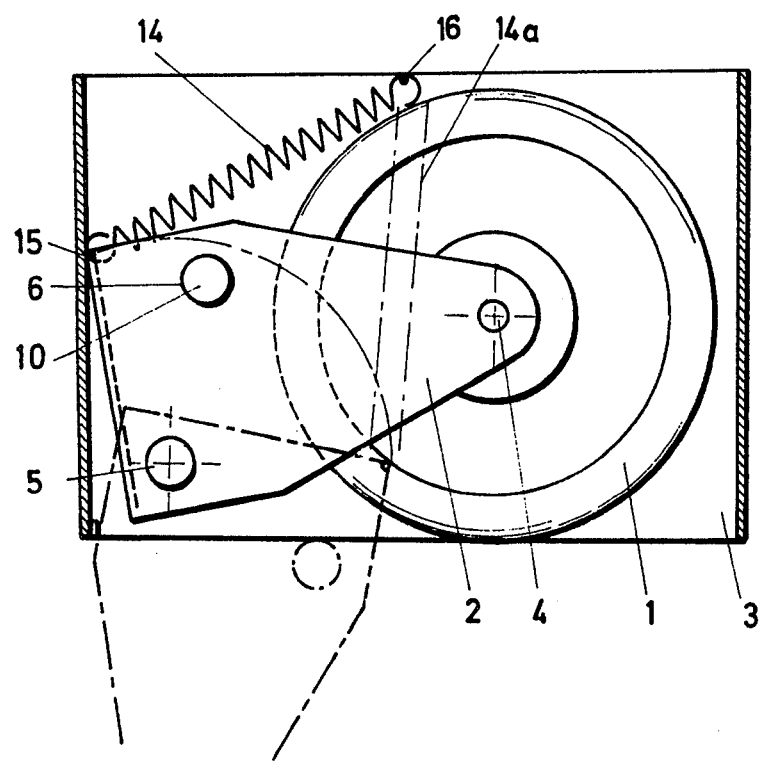

United States Patent [19]

Foge et al.

[11] 4,097,955

[45] Jul. 4, 1978

[54] DEVICE OR WHEEL UNIT FOR MOUNTING IN A SUITCASE

[75] Inventors: Helga Helene Føge, Lyngby, Denmark; Hans Thomas Thomsen, Friesvej 10, Greve Strand, Denmark

[73] Assignee: Hans Thomas Thomsen, Denmark

[21] Appl. No.: 553,621

[22] Filed: Dec. 2, 1975

[51] Int. Cl.² .............................................. B60B 33/00
[52] U.S. Cl. .................................... 16/29; 190/18 A; 280/37
[58] Field of Search ...................................... 16/29–34; 190/18 A; 280/37, 79.1 R; 24/265 B

[56] References Cited

U.S. PATENT DOCUMENTS

| | | | |
|---|---|---|---|
| 713,794 | 11/1902 | Ostermann | 24/265 B |
| 953,597 | 3/1910 | Dains | 24/265 B X |
| 2,097,349 | 10/1937 | Slader | 16/33 X |
| 2,522,439 | 9/1950 | Feurer | 24/265 B X |
| 2,581,417 | 1/1952 | Jones | 190/18 A X |
| 3,716,890 | 2/1973 | Benson | 16/34 X |

FOREIGN PATENT DOCUMENTS 550,044 10/1956 Italy .................................. 190/18 A Primary Examiner—Dorsey Newton
Attorney, Agent, or Firm—Hill, Gross, Simpson, Van Santen, Steadman, Chiara & Simpson

[57] ABSTRACT

A device or wheel unit for mounting in a suitcase, said device having an extensible and retractable wheel for rollably supporting the suitcase, and comprising a housing and a wheel the bearing of which is fixed in a pivotable bifurcated bracket, which device is to be mounted in a corner of the suitcase.

1 Claim, 4 Drawing Figures

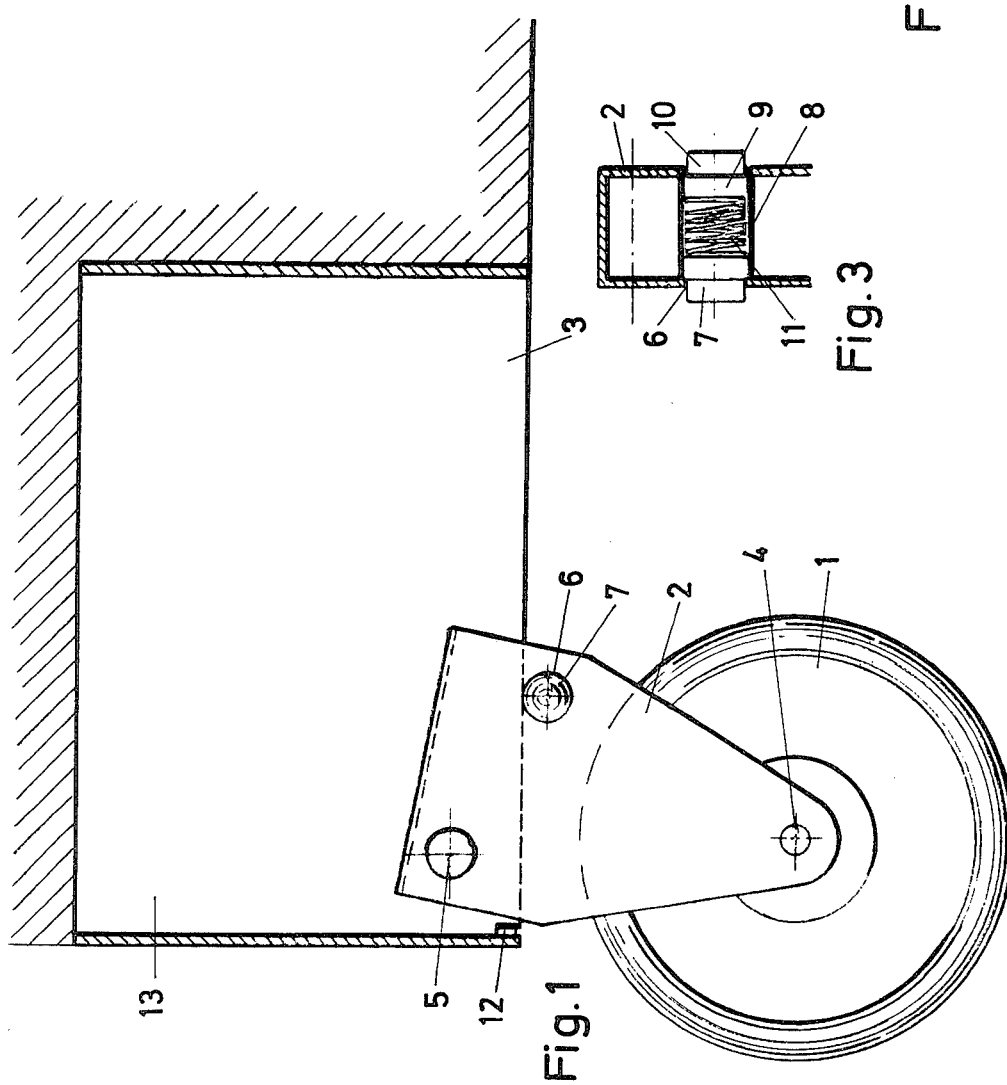

DEVICE OR WHEEL UNIT FOR MOUNTING IN A SUITCASE

BACKGROUND OF THE INVENTION

1. Field of the Invention

The invention relates to a device for mounting in a suitcase, said device being provided with a wheel and intended for transportation of the suitcase and including a box-shaped housing, in which a wheel is located in a pivotable bifurcated bracket, the pivot axis of which is placed near to one corner of the housing, and where the wheel can be retracted into the housing.

2. Prior Art

U.S. Pat. No. 3,918,038 refers to a suitcase provided with wheels, said wheels being supported in a pivotal bifurcated bracket which is actuated by means of a rod system which is operated from the other end of the suitcase.

SUMMARY OF THE INVENTION

Wheel units provided for suitcases should be easily mounted on existing types of suitcases. Also, the extension of the wheel out of or retraction into the suitcase must not be difficult, but yet the wheel must be secured against unwanted movement into or out of the suitcase. The wheel in its extended position must protrude sufficiently from the suitcase to enable free navigation over small obstacles such as curbings or steps.

The purpose of the present invention is to provide a simple device to be mounted in a suitcase, which device meets the above mentioned requirements and which is a cheap solution of the problem of making suitcases rolling.

The invention has a wheel bracket with a bushing in which at least one spring-loaded pin is axially slidable, the end of the pin protruding through a hole in the bracket.

The device occupies only a minimum of space in the suitcase. In the retracted position the spring causes the pin or pins to abut against the lateral walls of the housing with a certain friction, so that the wheel cannot of its own accord fall into extended or driving position.

The pivot axis of the bifurcated bracket is placed such that a manual force against the connecting part of the legs of the bifurcated bracket initiates outward pivoting of the bracket and wheel.

In a one embodiment of the invention there is a hole in one side wall of the housing, through which hole the end of the pin protrudes in the retracted position of the wheel, and the bifurcated bracket is biased by a spring is moved from its retracted or from its extended position toward an intermediate position therebetween. When the pin is pushed, the spring effects substantially the first half of the pivoting movement, and thereafter said wheel can be moved manually the rest of the way.

ON THE DRAWINGS:

FIG. 1 is a side view of the device according to the invention with the wheel in driving position, FIG. 2 shows the device of FIG. 1 viewed from the one end, FIG. 3 is an embodiment of a pin member and FIG. 4 is another embodiment of the device according to the invention.

In FIGS. 1 and 2 an embodiment of the device according to the invention is shown, said device including a wheel 1, a bifurcated bracket 2 and a housing 3 shown in cross-section. The wheel 1 is mounted on a shaft 4 in the bifurcated bracket 2, which is pivotable around a shaft 5 fixed to the side walls of the box-shaped housing 3.

In each leg of the bifurcated bracket there is a hole 6 through which a cylindrical pin 7 protrudes. The pins 7 are received in a bushing or sleeve 8 and have, as shown in FIG. 3, a portion 9 with a greater diameter than the protruding portion 10. The diameter of the hole 6 is less than the diameter of the larger portion 9, but greater than the smaller portion 10. By means of a compression spring 11 the pins 7 are urged outwardly, the two pins 7 being urged away from each other until the larger portions 9 rest against the bracket at the edge of the hole 6.

As shown in FIG. 2 the pins 7 in the driving position of the wheel project so far out of the hole 6 that their sides abut against the lower edge of the side walls of the housing. When the pins 7 are pressed manually inwardly, the bifurcated bracket 2 can pivot around its shaft 5, until the bracket abuts against the end wall of the housing. In this position the pins 7 press against the side walls of the housing, so that the bifurcated bracket 2 with the wheel 1 is held in this position. For swinging out the wheel, a manual force is applied inwardly against the left edge of the bifurcated bracket where its legs are connected together, which then mainly faces downwardly, whereby the wheel 1 is extended partially out of housing 3 so that it can be gripped and drawn completely into driving position.

In driving position the bifurcated bracket 2 abuts against a stop means 12 on the edge of the housing 3, whereby the bifurcated bracket 2 cannot move during transportation.

A set of two devices is for instance placed in the corners of a suitcase, there being a space 13 in each housing for the reception of the wheel 1 in the retracted position.

Although FIG. 3 shows two pins 7 protruding through the holes 6 in both sides or legs of the bifurcated bracket 2, there can also be only one pin 7, in which case there is only one hole 6.

FIG. 4 shows another embodiment of the device having a spring 14, one end of which is fastened in a hole 15 in the bifurcated bracket 2, and the other end is fixed to a transverse member 16 between the side walls at the top of the housing 3. Furthermore, there is a hole in the side wall of the housing corresponding to the smaller portion 10 of the pin 7, so that the pin in the retracted position of the bifurcated bracket 2 protrudes through this and a corresponding hole in the suitcase wall. When the pin 7 is pushed in, the spring 14 will draw the bifurcated bracket 2 with the wheel 1 partly out of housing 3, whereupon wheel 1 may be manually brought to the locked driving position. In this position spring 14 is again tensioned, as indicated at 14a, so that when the pin 7 is pushed, the bifurcated bracket 2 will be drawn partly into housing 3, and the wheel can manually be pushed further into housing 3 to the retracted locking position, where the pin 7 can again protrudes through the hole 6. In order not to risk unintentional release of the wheel 1 during forwarding, the hole in the side wall of the suitcase can be placed in a cup-shaped recess, so that the pin 7 does not protrude from the surface of the side wall.

What we claim is:

1. A wheel support for transporting a suitcase, comprising:

(a) a box-shaped housing adapted to be secured to the suitcase;

(b) a bifurcated bracket including a pair of legs joined together by a connecting part, said bracket being pivotally supported on said housing near one corner thereof;

(c) a wheel adapted to roll over small objects such as curbs or steps and rotatably carried on said bracket for pivoting therewith between a retracted and an extended position;

(d) a sleeve fixedly secured at its ends to said bracket and extending between its legs in registry with aligned apertures in said bracket, the outside of said sleeve being adjacent to said wheel; and (e) a pair of pins slidably retained in said sleeve, and a spring yieldingly biasing said pins apart, the ends of said pins normally projecting through said bracket apertures, the ends of said pins being laterally engageable with abutments on said housing in said extended position, and both of said pins being depressable endwise out of engagement with said housing when said bracket is in said extended position;

(f) and a further spring connected at one end to said connecting part of said bracket, and at the other end to the interior of the housing, said spring being more tensioned in both of said retracted and extended positions of said bracket than in a position intermediate said retracted and eztended positions.

* * * * *